United States Patent [19]
Jäger

[11] Patent Number: 5,183,881
[45] Date of Patent: Feb. 2, 1993

[54] O-AMINOAZO COMPOUNDS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 748,604

[22] Filed: Aug. 22, 1991

[30] Foreign Application Priority Data

Sep. 4, 1990 [DE] Fed. Rep. of Germany ....... 4027970

[51] Int. Cl.$^5$ .................. C09B 29/085; C09B 43/124
[52] U.S. Cl. .................... 534/732; 534/599; 534/643; 534/733
[58] Field of Search ................ 534/599, 643, 732, 733

[56] References Cited

U.S. PATENT DOCUMENTS

| | | | |
|---|---|---|---|
| 2,813,855 | 11/1957 | Bossard et al. | 534/732 |
| 2,831,850 | 4/1958 | Merian et al. | 534/732 X |
| 2,870,137 | 1/1959 | Merian et al. | 534/732 |
| 3,109,841 | 11/1963 | Gumprecht et al. | 534/732 X |
| 3,116,280 | 12/1963 | Frisch et al. | 534/599 X |
| 3,451,991 | 6/1969 | Kleiner | 534/732 |
| 4,230,618 | 10/1980 | Gauthier | 534/599 X |
| 4,537,958 | 8/1985 | Schaetzer et al. | 534/732 X |

FOREIGN PATENT DOCUMENTS 1569062 11/1980 United Kingdom .

Primary Examiner—Mary C. Lee
Assistant Examiner—Fiona T. Powers
Attorney, Agent, or Firm—Sprung, Horn Kramer & Woods

[57] ABSTRACT

The new o-aminoazo compounds of the formula

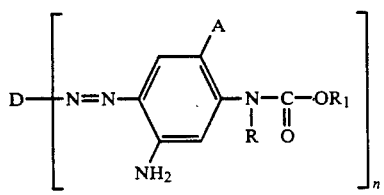

in which the substituents D, A, R and $R_1$ and the index n have the meaning given in the description are valuable intermediates for the preparation of metal complex dyestuffs and are also highly suitable for the dyeing of wool and polyamide.

3 Claims, No Drawings

O-AMINOAZO COMPOUNDS

The present invention relates to new o-aminoazo compounds of the formula

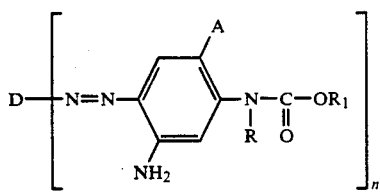

in which
D represents the radical of a diazo component,
A represents hydrogen, alkyl, alkoxy, halogen, carboxyl or sulpho,
R represents hydrogen or alkyl,
$R_1$ represents alkyl, aralkyl, aryl or cycloalkyl, and
n represents 1 or 2,
it being possible for the abovementioned alkyl, alkoxy, aryl, aralkyl and cycloalkyl radicals to be substituted or unsubstituted,
and to processes for their preparation.

In formula (I),
D preferably represents a substituted or unsubstituted radical from the benzene, naphthalene, diphenyl, stilbene or heterocyclic series,
A preferably represents hydrogen, substituted or unsubstituted $C_1-C_4$-alkyl, substituted or unsubstituted $C_1-C_4$-alkoxy, fluorine, chlorine, bromine, —COOH or —$SO_3H$,
R preferably represents hydrogen or substituted or unsubstituted $C_1-C_4$-alkyl,
$R_1$ preferably represents substituted or unsubstituted $C_1-C_4$-alkyl, phenyl($C_1-C_2$)alkyl which is unsubstituted or substituted in the phenyl portion, substituted or unsubstituted phenyl or substituted or unsubstituted $C_5-C_6$-cycloalkyl, and
n preferably represents 1 or 2.

Examples of suitable substituents of the radical D are: $C_1-C_4$-alkyl, $C_1-C_4$-alkoxy, it being possible for these alkyl or alkoxy radicals to be substituted, for example, by OH, —$OCH_3$, —COOH, —$OSO_3H$, —$SO_3H$; —$SO_3H$, —COOH, halogen atoms, such as F, Cl or Br; $NH_2$, OH, $NO_2$, phenylamino, it being possible for the phenyl radical to be substituted, for example, by $CH_3$, —$OCH_3$, —$SO_3H$; phenylazo and naphthylazo, it being possible for these radicals to be substituted in particular by —$SO_3$.

A preferred substituent of the radical D is the sulpho group.

Examples of substituted or unsubstituted $C_1-C_4$-alkyl in the definition of A, R and R are methyl, ethyl, n-propyl, iso-propyl, n-butyl, s-butyl, i-butyl or t-butyl, suitable substituents being in each case, for example: OH, —$OCH_3$, —COOH, —$OSO_3H$ or —$SO_3H$.

Examples of substituted or unsubstituted $C_1-C_4$-alkoxy in the definition of A are methoxy, ethoxy, n-propoxy, iso-propoxy, n-butoxy, s-butoxy, i-butoxy or t-butoxy, suitable substituents being in each case, for example, the substituents mentioned above for alkyl.

Examples of radicals R are $CH_3$, —$C_2H_5$, —$C_2H_5OH$, —$CH_2$—$CH_2COOH$, —$CH_2CH_2SO_3H$.

Examples of radicals R are methyl, ethyl, n-propyl, iso-propyl, n-butyl, iso-butyl, t-butyl, phenyl, benzyl, phenethyl, cyclopentyl and cyclohexyl, suitable alkyl and cycloalkyl substituents being in each case OH, —COOH and —$SO_3$, and phenyl, benzyl and phenyl substituents being in each case OH, Cl, Br or methyl.

Preferred compounds within the formula (I) are those of the formulae

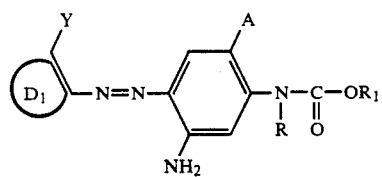

in which
A, R and $R_1$ have the abovementioned general and preferred meaning,
$D_1$ represents the radical of a diazo component from the benzene, naphthalene, diphenyl, stilbene or heterocyclic series, which additionally can contain the substituents mentioned for D by way of example, and
Y represents —$OCH_3$ or —$OC_2H_5$;

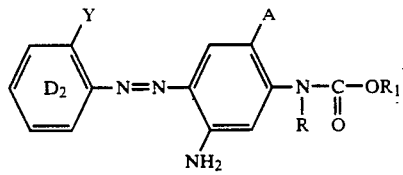

in which
A, R and $R_1$ have the abovementioned general and preferred meaning,
the benzene ring $D_2$ can additionally contain the substituents mentioned for D by way of example, and
Y represents —$OCH_3$ or —$OC_2H_5$;

$$\text{(IV)}$$

(CH_3)_{0-1} \quad (CH_3O)_{0-1} \quad (SO_3H)_{1-2} in which
A has the abovementioned general and preferred meaning,
and represents in particular hydrogen, Cl, —COOH, —$SO_3H$, —$CH_3$ or —$OCH_3$,
R has the abovementioned general and preferred meaning,
and in particular represents hydrogen, —$CH_3$, —$C_2H_5$, —$C_2H_5OH$, —$CH_2CH_2COOH$ or —$CH_2CH_2SO_3H$,
$R_1$ has the abovementioned general and preferred meaning,
and in particular represents —$CH_3$, —$C_2H_5$, n-$C_3H_7$, i-$C_3H_7$, benzyl, phenyl or cyclohexyl, and
Y represents —$OCH_3$ or —$OC_2H_5$.

Particularly preferred compounds of the formulae (I), (II), (III) and (IV) are those in which
R represents hydrogen
$R_1$ represents $CH_3$ or —$C_2H_5$, and A represents hydrogen, Cl, —COOH, —SO₃, CH₃ or —OCH₃.

Very particular preference is given to compounds of the formulae (I), (II), (III) and (IV) in which R represents hydrogen
R₁ represents CH₃ or —C₂H₅, and
A represents hydrogen.

The new o-aminoazo compounds of the formula (I) can be prepared by acylating aminoazo dyestuffs of the formula

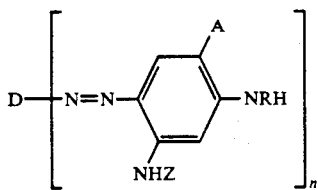 (V)

in which

Z represents acyl, preferably C₁-C₆—alkylcarbonyl, C₁-C₆-alkenylcarbonyl, carboxycarbonyl, phenylcarbonyl or phenyl-C₁-C₄-alkylcarbonyl, and D, A, R and n have the abovementioned meaning, with chloroformates of the formula

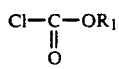 (VI)

in which

R₁ has the abovementioned meaning, to give a compound of the formula

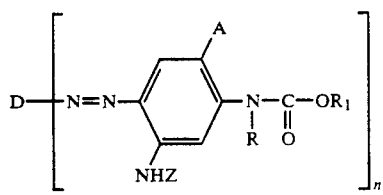 (VII)

in which

D, A, R, R:, n and Z have the abovementioned meaning, and then hydrolysing this compound by heating in acid medium to give a compound of the formula (I).

The aminoazo compounds (V) are obtained in a known manner by coupling diazotised or tetraazotised amines of the formula

 (VIII)

in which

D and n have the abovementioned meaning onto amines of the formula

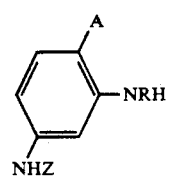 (IX)

in which

A, R and Z have the abovementioned meaning, in weakly acid medium (pH range 2-5, preferably 3-4).

The acylation of the aminoazo compounds (V) with the chloroformates (VI) is preferably carried out in water at 0°-30° C., in particular 10°-20° C., and at a pH of 3-8, in particular 5-7, the hydrochloric acid liberated during the acylation being neutralised by adding alkali metal hydroxides, carbonates, bicarbonates or phosphates, or alkaline earth metal hydroxides, carbonates, bicarbonates or phosphates.

The hydrolysis of the compounds (VII) to give the aminoazo compounds (I) preferably takes place in water by heating to 60°-110° C., in particular 80°-90° C., in the presence of acid. The amount of acid is 0.5-3 mol, preferably 1-2 mol, of acid per liter of hydrolysis solution. In particular hydrochloric or sulphuric acid is used as the acid.

Suitable examples of amines (VIII), in which n represents or 2, amines (IX) and chloroformates (VI) are:

Amines of the formula (VIII) where n is 1:
1-amino-2-methoxy-5-sulpho-benzene,
1-amino-2-methoxy-4-sulpho-benzene,
1-amino-2-methoxy-5-methyl-4-sulpho-benzene,
1-amino-2-methoxy-3,5-disulpho-benzene,
1-amino-2-chloro-4-sulpho-benzene,
1-amino-2-chloro-5-sulpho-benzene,
1-amino-2-methoxy-benzene,
1-amino-2,5-dimethoxy-benzene,
1-amino-2-ethoxy-benzene,
1-amino-2-sulpho-benzene,
1-amino-4-sulpho-benzene,
1-amino-2-nitro-benzene,
1-amino-2-nitro-4-sulpho-benzene,
2-amino-4,8-disulpho-naphthalene,
2-amino-6,8-disulpho-naphthalene,
2-amino-6-sulpho-naphthalene,
2-amino-8-sulpho-naphthalene,
2-amino-4,6,8-trisulpho-naphthalene,
1-amino-4-sulpho-naphthalene,
1-amino-4,6-disulpho-naphthalene,
1-amino-2-hydroxy-4-sulpho-naphthalene,
1-amino-2-hydroxy-6-nitro-4-sulpho-naphthalene,
2-amino-3-methoxy-6-sulpho-naphthalene,
2-amino-3-methoxy-6,8-disulpho-naphthalene,
2-amino-3-hydroxy-6-sulpho-naphthalene,
2-amino-3-hydroxy-6,8-disulpho-naphthalene,
4-amino-2-sulpho-stilbene,
4-amino-2,2'-disulpho-stilbene,
4-amino-2,4'-disulpho-stilbene,
4-amino-4'-nitro-2,2,-disulpho-stilbene,
1-amino-2-ethoxy-6-sulpho-naphthalene,
1-amino-2-carboxymethoxy-6-sulpho-naphthalene,
1-amino-2-hydroxy-4-nitro-6-sulpho-benzene,
1-amino-2-hydroxy-6-nitro-4-sulpho-benzene,
1-amino-2-methoxy-3-nitro-5-sulpho-benzene,
1-amino-2-methoxy-5-nitro-4-sulpho-benzene,
1-amino-2-hydroxy-5-nitro-4-sulpho-benzene,
2-methyl-4-amino-5-methoxyazobenzene-4'-sulphonic acid,
2-methyl-4-amino-5-methoxyazobenzene-2', 5'-disulphonic acid,
3-methoxy-4-aminoazobenzene-4'-sulphonic acid,
2,5-dimethoxy-4-aminoazobenzene-2', 5'-disulphonic acid,
2,5-dimethoxy-4-aminoazobenzene-4'-sulphonic acid,
2-(2'-metnyl-4'-amino-5'-methoxyphenylazo)-naphthalene-4,8-disulfonic acid.

Amines of the formula (VIII) where n is 2:

4,4'-diamino-2,2'-disulpho-stilbene,
4,4'-diamino-3,3'-disulpho-diphenyl,
4,4'-diamino-2,2'-disulpho-diphenyl,
4,4'-diamino-3,2'-disulpho-diphenylamine,
4,4'-diamino-3,3'-dimethoxy-diphenyl,
4,4'-diamino-3,3'-dimethoxy-5,5'-disulpho-diphenyl urea.

Amines of the formula (IX):
1-amino-3-formylamino-benzene,
1-amino-3-acetylamino-benzene,
1-amino-3-oxalylamino-benzene,
1-amino-3-oxyacetylamino-benzene,
1-amino-3-propionylamino-benzene,
1-amino-3-acetylamino-6-methyl-benzene,
1-amino-3-acetylamino-6-methoxy-benzene,
1-amino-3-acetylamino-6-carboxy-benzene,
1-amino-3-acetylamino-6-sulpho-benzene,
1-amino-3-acetylamino-6-chloro-benzene,
1-N-methylamino-3-acetylamino-benzene.

Chloroformates of the formula (VI)
methyl chloroformate,
ethyl chloroformate,
iso-propyl chloroformate,
n-propyl chloroformate,
n-benzyl chloroformate.

The new o-aminoazo compounds (I) are valuable intermediates for the synthesis of metal complex dyestuffs.

The new o-aminoazo compounds (I) are highly suitable for the dyeing of wool and polyamide.

The formulae of the water-soluble compounds in the description and in the examples are those of the free acids. The substances are in general isolated and applied in the form of their alkali metal salts, in particular the lithium salts, sodium salts or potassium salts.

EXAMPLE 1

20.3 g of 1-amino-2-methoxy-5-sulfo-benzene (diazo component) are dissolved in 100 ml of water under neutral conditions. The solution is cooled to 0°-5° C. by adding ice, 30 ml of 30% strength hydrochloric acid are then added with stirring and 70 ml of 10% strength sodium nitrite solution are added dropwise. After diazotisation is complete, excess nitrite is destroyed with sulphamic acid. 16.6 g of 3-amino-acetanilide (coupling component) are added in the form of an aqueous solution. The pH is then brought to 3-4 with 15% strength sodium carbonate solution. After stirring for several hours, the coupling reaction is complete. The precipitated solid is filtered off with suction. It has the formula

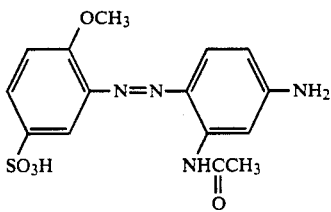

The water-moist paste is dissolved in about 200 ml of water under neutral conditions. The solution is cooled to 10° C. by adding ice, and 13 g of ethyl chloroformate are then added dropwise, while maintaining the pH between 6 and 7 by dropwise addition of 15% strength sodium carbonate solution at the same time.

After acylation is complete, as a result of which the dyestuff of the formula

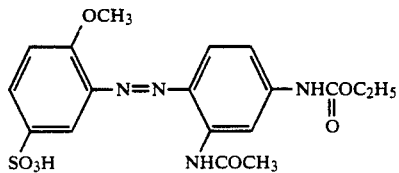

is formed, the reaction mixture is heated to 90° C. and concentrated hydrochloric acid is added in such an amount that a 1N hydrochloric acid solution is present. After stirring for about two hours, the acetyl group has been eliminated, leading to the precipitation of the sparingly soluble betaine of the dyestuff of the formula

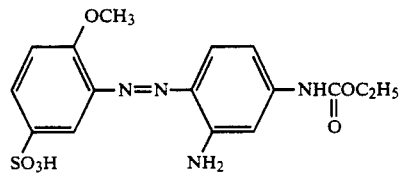

$\lambda_{max} = 426$

The dyestuff is filtered off with suction and washed thoroughly with water. The resulting dark brown paste is readily soluble in water, giving a yellow solution after the addition of alkalis.

Further o-aminoazo dyestuffs having $\lambda_{max}$ the values mentioned in the last column are obtained by the procedure of Example 1, using the amines listed in column 1 as the diazo component, the amines mentioned in column 2 as the coupling component and the chloroformates mentioned in column 3.

| Example | Diazo component | Coupling component | Chloroformate Cl—C—OR$_1$ ‖ O  R$_1$ | $\lambda_{max}$ |
|---|---|---|---|---|
| 2 | 1-Amino-2-methoxy-5-sulpho-benzene | 1-Amino-3-acetyl amino-benzene | Methyl | 426 |
| 3 | 1-Amino-2-methoxy-5-sulpho-benzene | 1-Amino-3-formyl-amino-benzene | Ethyl | 426 |
| 4 | 1-Amino-2-methoxy-5-sulpho-benzene | 1-Amino-3-oxalyl-amino-benzene | Ethyl | 426 |
| 5 | 1-Amino-2-methoxy-4-sulpho-5-methyl-benzene | 1-Amino-3-acetyl-amino-benzene | Methyl | 444 |
| 6 | 1-Amino-2-methoxy-4-sulpho-5-methyl-benzene | 1-Amino-3-acetyl-amino-benzene | Ethyl | 444 |

| Example | Diazo component | Coupling component | Chloroformate Cl—C(=O)—OR₁ R₁ | $\lambda_{max}$ |
|---|---|---|---|---|
| 7 | 2-Amino-4,8-disulpho-naphthalene | 1-Amino-3-acetyl-amino-benzene | Ethyl | 454 |
| 8 | 1-Amino-2-methoxy-benzene | 1-Amino-2-sulpho-5-acetylamino-benzene | Ethyl | |
| 9 | 4-Amino-5-methoxy-2-methylazobenzene-2',5'-disulphonic acid | 1-Amino-3-acetyl-amino-benzene | Ethyl | 486 |

I claim:
1. A compound of the formula

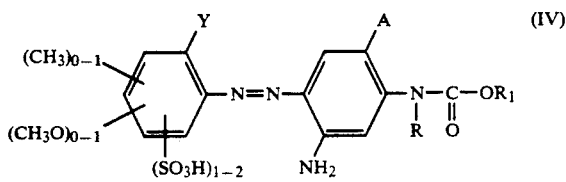

in which
Y represents —OCH$_2$ or —OC$_2$H$_5$.
A represents hydrogen, Cl, —COOH, —SO$_3$H, —CH$_3$ or —OCH$_3$,
R represents hydrogen, —CH$_3$, —C$_2$H$_5$, —C$_2$H$_5$OH, —CH$_2$CH$_2$COOH or —CH$_2$CH$_2$SO$_3$H, and
R$_1$ represents CH$_3$, —C$_2$H$_5$, n—C$_3$H$_7$, benzyl, phenyl or cyclohexyl.

2. A compound of claim 1 in which
R represents hydrogen
R$_1$ represents CH$_3$ or —C$_2$H$_5$, and
A represents hydrogen.

3. A compound according to claim 1 of the formula

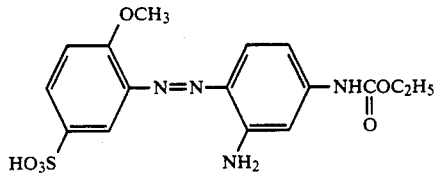

* * * * *

UNITED STATES PATENT AND TRADEMARK OFFICE
CERTIFICATE OF CORRECTION

PATENT NO. : 5,183,881

DATED : February 2, 1993

INVENTOR(S) : Horst Jager

It is certified that error appears in the above-identified patent and that said Letters Patent is hereby corrected as shown below:

Title Page (Item 56)  U.S. PATENT DOCUMENTS: Delete " 4,537,958 " and substitute -- 4,537,598 --

Col. 7, line 26  Delete " $OCH_2$ " and substitute -- $OCH_3$ --

Signed and Sealed this

Thirtieth Day of August, 1994

*Attest:*

BRUCE LEHMAN

*Attesting Officer*   *Commissioner of Patents and Trademarks*